United States Patent
Jain et al.

(10) Patent No.: US 12,050,991 B1
(45) Date of Patent: Jul. 30, 2024

(54) CONNECTOMICS-BASED NEURAL ARCHITECTURE SEARCH

(71) Applicant: Google LLC, Mountain View, CA (US)

(72) Inventors: Viren Jain, San Francisco, CA (US); Jeffrey Adgate Dean, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 1110 days.

(21) Appl. No.: 16/418,074

(22) Filed: May 21, 2019

Related U.S. Application Data (60) Provisional application No. 62/674,299, filed on May 21, 2018.

(51) Int. Cl.
  *G06N 3/08* (2023.01)
  *G06N 3/045* (2023.01)
  *G06N 20/00* (2019.01)

(52) U.S. Cl.
  CPC ............... *G06N 3/08* (2013.01); *G06N 3/045* (2023.01); *G06N 20/00* (2019.01)

(58) Field of Classification Search
  CPC ........ G06N 3/08; G06N 3/0454; G06N 20/00; G06N 20/10; G06N 20/20
  USPC .......................................................... 706/25
  See application file for complete search history.

(56) References Cited

U.S. PATENT DOCUMENTS

| | | | |
|---|---|---|---|
| 2018/0336453 A1* | 11/2018 | Merity | G06N 3/0445 |
| 2019/0057309 A1* | 2/2019 | Oobuchi | G06N 3/063 |
| 2019/0333219 A1* | 10/2019 | Xu | G06N 3/084 |

OTHER PUBLICATIONS

Machine Learning on Human Connectome Data from MRI (Year: 2016).*
Evaluation of machine learning algorithms for treatment outcome prediction in patients with epilepsy based on structural connectome data (Year: 2015).*
Hierarchical Representations for Efficient Architecture Search (Year: 2018).*
Zoph et al., Neural Architecture Search With Reinforcement Learning, Feb. 15, 2017, 16 pages (Year: 2017).*

\* cited by examiner

*Primary Examiner* — Omar F Fernandez Rivas
*Assistant Examiner* — Tri T Nguyen
(74) *Attorney, Agent, or Firm* — DORITY & MANNING P.A.

(57) ABSTRACT

The present disclosure provides systems and methods that generate new architectures for artificial neural networks based on connectomics data that describes connections between biological neurons of a biological organism. In particular, in some implementations, a computing system can identify one or more new artificial neural network architectures by performing a neural architecture search over a search space that is constrained based at least in part on the connectomics data.

20 Claims, 3 Drawing Sheets

CONNECTOMICS-BASED NEURAL ARCHITECTURE SEARCH

RELATED APPLICATIONS

This application claims priority to and the benefit of U.S. Provisional Patent Application No. 62/674,299, filed May 21, 2018. U.S. Provisional Patent Application No. 62/674,299 is hereby incorporated by reference in its entirety.

FIELD

The present disclosure relates generally to exploration of novel artificial neural network architectures. More particularly, the present disclosure relates to systems and methods that generate new architectures for artificial neural networks based on connectomics data.

BACKGROUND

Artificial neural networks are a class of machine-learned models that are especially powerful, accurate, or otherwise high-performing for various tasks. An artificial neural network can include a group of connected nodes, which also can be referred to as (artificial) neurons or perceptrons. An artificial neural network can be organized into one or more layers. Neurons of the artificial neural network can be connected with edges.

Artificial neural networks that include multiple layers can be referred to as "deep" networks. A deep network can include an input layer, an output layer, and one or more hidden layers positioned between the input layer and the output layer. The nodes of the neural network can be connected or non-fully connected.

Example artificial neural networks include feed-forward neural networks, recurrent neural networks, convolutional neural networks, or other forms of artificial neural networks. Each of these example types has different internal structures or "architectures" that enable, in part, the particular benefits provided by that type of artificial neural network. For example, the architecture of an artificial neural network can correspond to or include the structure, arrangement, number, types, behavior, and/or other properties of the artificial neurons included in the network and also their respective edges.

One developing field of study is that of neural architecture search. Neural architecture search uses the principles and techniques of machine learning to automate or "learn" the design of artificial neural network architectures. In particular, as examples, neural architecture search techniques may seek to automate the specification and discovery of entire neural network topologies, activation functions, gradient update rules, and/or many other complex details that underlie state-of-the-art deep learning architectures. These efforts assume various names in addition to neural architecture search, including "learning to learn," "AutoML," "meta-learning," or the like.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining, by one or more computing devices, connectomics data that describes a plurality of neural connections between a plurality of biological neurons of one or more biological organisms. The method includes performing, by the one or more computing devices, a neural architecture search to identify one or more new artificial neural network architectures. A search space over which the neural architecture search is performed is constrained based at least in part on the connectomics data.

Another example aspect of the present disclosure is directed to a computer-implemented method of automatically generating neural network architectures. The method includes receiving data representing connections between a plurality of neurons of a biological organism. The method includes processing the received data to generate the one or more new neural network architectures that are based on the data representing connections but that are different than the connections between the plurality of neurons.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

Overview

Generally, the present disclosure is directed to systems and methods that generate new architectures for artificial neural networks based on connectomics data that describes connections between biological neurons of a biological organism. In particular, in some implementations, a computing system can identify one or more new artificial neural network architectures by performing a neural architecture search over a search space that is constrained based at least in part on the connectomics data. Thus, structural or other forms of information gleaned from the connectomics data can be used to guide or otherwise influence the neural architecture search process, thereby providing novel neural architectures which may provide various advances and benefits.

More particularly, recent advances in the field of connectomics are delivering synapse-resolution connectivity of neural tissue of biological organisms (e.g., brains of animals) at a regular cadence and with exponentially increasing scale. Generally, the overall pipeline for mapping the synaptic connectivity of brains involves two steps: First, imaging neural tissue such as a portion of a brain, in three dimensions at nanometer resolution; and second, reconstructing the shape of the cells and identifying connections between them, using some combination of automated and/or manual image analysis. As a result of recent software and hardware advances that improve performance of both of these steps, there are a number of connectomes that are either completed, in progress, or being planned with high confidence, including connectomes for at least portions of the brains of a drosophila (fruit fly), mouse, zebrafinch, zebrafish, and human.

Thus, connectomics data is becoming increasingly available and with enhanced level of detail. As such, the present disclosure provides systems and methods that use such connectomics data to guide neural architecture search techniques. In particular, automated neural architecture search that incorporates connectomics-derived data is formulation of computational neuroscience that provides new and scalable lines of attack for improving machine learning technology, and specifically neural architecture search.

According to an aspect of the present disclosure, a computing system can obtain connectomics data that describes a plurality of neural connections between a plurality of biological neurons of one or more biological organisms. For example, the plurality of biological neurons can be contained within neural tissue (e.g., brain tissue) of the one or more biological organisms.

In particular, in some implementations, the computing system can access a database that stores one or more connectomes. A connectome 'S' can be a data structure that encodes, in a structured way, the cumulative knowledge related to some specific set of biological neurons that have been examined. More specifically, a connectome can specify, among other items, the anatomical connectivity of the biological neurons that were imaged, along with various side information.

In some implementations, a connectome can provide connectivity data that describes a plurality of neural connections between the plurality of biological neurons. For example, a connectome can specify a directed graph that is the reconstructed connectivity of the neural tissue. In some cases, edges between nodes of the graph can be annotated as positive or negative (i.e., excitatory or inhibitory). Graph edges may in some cases also be weighted, as the strength of individual connections can in some cases be estimated directly from the image content.

In some implementations, a connectome can provide geometry data that describes a physical location of one or more of the plurality of neural connections or a shape or a location of one or more of the plurality of biological neurons. For example, the connectome can describe a physical location of each connection (e.g., graph edge), and the shape and location of each neuron (e.g., graph node).

In some implementations, a connectome can provide biophysics data that describes biophysical characteristics of one or more of the plurality of biological neurons. For example, a connectome can provide knowledge of neuron biophysics that may provide activation functions and other dynamical properties associated with nodes in the graph. Graph edges may also specify dynamics (e.g., synaptic release probability).

In some implementations, a computing system can use the biophysics data to select an activation function for one or more artificial neurons that respectively correspond to one or more of the biological neurons. Alternatively or additionally, the computing system can use the biophysics data (e.g., the synaptic release probability data) to select a respective edge weight for an edge between artificial neurons (e.g., the weight can match or mimic the synaptic release probability of the corresponding neural connection between biological neurons).

In some implementations, the biophysics data can be assigned to each node in a graph provided by a connectome based on the shape of the biological neuron to which such node corresponds. That is, different types of neurons exhibit different biophysical characteristics. By examining the shape of a biological neuron, its type can be determined. Thereafter, a set of biophysics data that is associated with the identified type can be associated with the node in the graph that corresponds to the biological neuron. The set of biophysics data can be a behavior profile associated with all neurons of that type.

In some implementations, a connectome can provide activity data that describes observed activations of one or more of the plurality of biological neurons in response to one or more stimuli. For example, in some cases functional recordings of a piece of brain will be available and can be stored as a time-series of cell activity versus time in the context of various stimulus presentations.

In one example, the activity data can describe observed activations of a biological neuron in response to one or more stimuli. In some implementations, a computing system can modify one or more parameters of an artificial neuron that corresponds to the biological neuron such that test activations of the artificial neuron to the one or more stimuli approximate the observed activations of the biological neuron in response to the one or more stimuli. As one example, the computing system can perform supervised learning on the artificial neuron using the activity data as training data. As another example, parameters of the artificial neuron can be manually tuned. The learning or manual tuning of artificial neuron parameters can be performed for several artificial neurons (e.g., a whole artificial neural network) at once or for a specific artificial neuron individually.

Thus, a number of individual connectomes $S_k=\{connectivity_k, activity_k, geometry_k, biophysics_k\}$ may be available and can be stored in the form of a database of N connectomes $C=\{S_1, \ldots, S_n\}$. The present disclosure provides systems and methods that leverage the database C to usefully influence neural architecture search.

In particular, in some implementations, a computing system can identify one or more network motifs described by the connectomics data. For example, each network motif can include or represent a recurrent pattern within the neural connections between the biological neurons described by a connectome (e.g., within a directed graph provided by the connectome). Thus, a motif can include a plurality of neurons arranged (e.g., connected) according to a certain, defined structure. The identified network motifs can be used to guide (e.g., constrain) the neural architecture search process.

More particularly, a network motif can be a recurrent and statistically significant sub-graph or pattern within the connectome and can be used by aspects of the present disclosure to bridge connectomes and neural architecture search. The present disclosure resolves two main technical challenges in this regard.

First, a computing system can identify interesting motifs within connectomes. While motif discovery is a relatively mature area of graph algorithms, connectomes pose special considerations and new challenges. As such, the systems and methods of the present disclosure can leverage knowledge of the biophysics and geometry of the network (and the resulting effect on the computational behavior of the network) to usefully influence motif discovery. Various different motif search or motif finding algorithms can be used to identify network motifs.

As one example, the location of a neural connection (e.g., relative to other neural connections) impacts the function of the biological neurons connected by such neural connection. Thus, in some implementations, the motif identification process can be annotated so that the identification process is aware of the different connection locations.

Furthermore, the systems and methods of the present disclosure can search for motifs at multiple levels of abstraction that are of interest. For example, in certain neural architectures, both the fine-scale motifs (e.g., convolution, pooling, winner-take-all) as well as the large-scale motifs (e.g., alternating layers of convolution and pooling) are important to an effective computational interpretation of the circuit. As such, the present disclosure can generate connectomics-derived motifs that are multi-scale.

Second, the systems and methods of the present disclosure can use the derived motifs to influence the neural architecture search process. For example, in some implementations, connectomics data does not necessarily dominate the behavior of the neural architecture search process, but rather provides a useful and interesting database of possible graph structures that might have been inefficient or unlikely to discover through other means.

According to another aspect of the present disclosure, a computing system can identify one or more new artificial neural network architectures by performing a neural architecture search over a search space that is constrained based at least in part on the connectomics data (e.g., based on the identified network motifs).

As one example, connectomics-derived network motifs can be used to constrain the neural architecture search process by adding or using such motifs to a collection of seed/base structures. For example, a computing system can use one or more connectomics-derived network motifs as a seed structure for a neural architecture search. For example, the seed structure can serve as an initial state for evolutionary-based approaches which evolve from such initial state and/or as an initial state for reinforcement learning approaches which iteratively suggest (e.g., by a recurrent neural network-based controller) new architectures based on performance feedback.

As one particular example, a computing system can perform a neural architecture search by iteratively proposing new architectures, where each proposed architecture is constructed from only combinations of a set of predefined motifs. More particularly, a set of predefined motifs can be established. The set of predefined motifs can, in some implementations, include only motifs identified from the connectomics data while, in other implementations, the set of motifs includes a mix of commonly used motifs with connectomics-derived motifs. For example, the commonly used motifs can include primitive operations (e.g., 1×1 convolution, 3×3 depthwise convolution, 3×3 separable convolution, 3×3 max-pooling, 3×3 average pooling, identity, etc.).

During the search process, proposed architectures can be limited to different combinations of the motifs from the set. Thus, in some instances, all proposed architectures can be constructed from the same motifs but can, for example, have different weights. Reducing the search space to combinations of the set of predefined motifs can greatly accelerate the search process and, likewise, reduce the amount of computing resources required to complete the search. In some implementations, the proposed architecture can be a proposed structure for a single layer which can then be stacked upon itself in series to form a deeper network.

As another example, connectomics-derived network motifs can be used to constrain the neural architecture search process by providing alternative hypotheses during higher-level motif assembly. For example, a computing system can use one or more connectomics-derived network motifs as a higher-level structure into which one or more lower-level structures are assembled. For example, the lower-level structures can be primitive operations or can be lower-level motifs.

More particularly, in some implementations, a computing system can perform a neural architecture search according to a hierarchical genetic representation scheme that provides modularized design patterns. For example, a computing system can propose architectures that exhibit a multi-level hierarchical architecture representation. At each level in the hierarchy, one or more lower-level structures can be assembled (e.g., randomly) into a higher-level structure (which may be referred to as "an adjacency matrix"). In particular, in some implementations, the higher-level structure can be a predefined structure and assembling the lower-level structures into the higher-level structure can include replacing an operation included in the higher-level structure with one of the lower-level structures. Thus, the lower-level structures can be combined within the overall structure provided by the higher-level structure.

In some implementations, at a lowest level, the lower-level structures can be primitive operations (e.g., 1×1 convolution, 3×3 depthwise convolution, 3×3 separable convolution, 3×3 max-pooling, 3×3 average pooling, identity, etc.) while, at each level above the lowest level, the lower-level structures can be structures generated from one or more assembly performed at the level below. Thus, each hierarchical level can combine structures generated from the level below into a new, more complex structure.

In some implementations, a computing system can perform an architecture search by randomly reassembling, at each of a plurality of iterations, one or more of the structures at one or more of the hierarchical levels and/or otherwise modifying aspects of the network architecture.

Further, according to an aspect of the present disclosure, in some implementations, one or more of the connectomics-derived network motifs can be used as a higher-level structure (or "adjacency matrix") for one or more of the hierarchical levels. For example, the higher-level structure at each level can be selected from a set of predefined motifs. The set of predefined motifs can, in some implementations, include only motifs identified from the connectomics data while, in other implementations, the set of motifs includes a mix of commonly used motifs with connectomics-derived motifs. Thus, connectomics-derived network motifs can be used at least in part to build a hierarchical architecture.

As yet another example, connectomics-derived information can be used to constrain the neural architecture search process by deriving statistical measures of connectomes and using such statistical measures as a "prior" or other guidance on the space of graphs/computation architectures. Thus, in one example, a computing system can determine one or more statistical measures descriptive of one or more characteristics of the connectomics data (e.g., a connectome as a whole or more specifically with respect to the network motifs). The computing system can impose one or more constraints on the neural architecture search, where the one or more constraints respectively require the new artificial neural network architectures generated by the search to satisfy the one or more statistical measures. The constraints can be hard (e.g., the generated architectures must absolutely satisfy the constraints) or the constraints can be soft (e.g., compliance with the constraints is rewarded and/or violation of the constraints is penalized).

Example statistical measures that can be determined/imposed include one or more of: a ratio of inhibitory to excitatory connections; a frequency of recurrent connections; a placement of recurrent connections; a number of layers; a size of layers; a frequency of skip connections; a placement of skip connections; and/or a ratio of different neuron types.

As another example, similar to the user of statistical measures described above, connectomics-derived network motifs can be used to constrain the neural architecture search process by providing a basis of comparison when judging architectural value. In particular, in some implementations, a computing system can obtain a plurality of candidate architectures (e.g., generated according to any number of different architecture suggestion techniques) and can determine a respective similarity of each candidate architecture to one or more network motifs derived from the connectomics data. The computing system can selectively keep or discard candidate architectures based on their similar to the connectomics-derived network motifs. For example, candidate architectures that have been judged to be more similar to the network motifs can be retained while candidate architectures that have been judged to be less similar to the network motifs can be discarded. In such fashion, architectures that mimic the overall structural nature of biological networks can be rewarded and propagated.

In particular, in some implementations, a computing system can input each candidate architecture into a discriminator model that has been trained as part of a generative adversarial network to discriminate between authentic (i.e., biological) network motifs and inauthentic network motifs. The computing system can receive a respective label for each candidate architecture as an output of the discriminator model, where each respective label indicates a judgment of the discriminator that the corresponding candidate architecture is authentic or inauthentic. The computing system can discard each candidate architecture that received a label indicating a judgment of the discriminator that the corresponding candidate architecture is inauthentic.

In particular, proposing new model architectures (e.g., via mutation or otherwise) is relatively computationally inexpensive or otherwise less complex than actually training and evaluating models that embody the architecture, which is relatively computationally expensive or otherwise more complex. As such, resource savings can be obtained by using the discriminator model to quickly and inexpensively (in a computational sense) screen and reject proposed architectures that do not satisfactorily mimic the identified biological architectures. Thus, the discriminator screening technique can be added into and benefit any existing architecture search pipeline or framework.

In another related example, a computing system can use a generator model to generate a plurality of synthetic motifs, where the generator model has been trained as part of a generative adversarial network that has been trained using one or more connectomics-derived network motifs as training data (e.g., as examples of authentic motifs). This technique can create a large body of "biologically-inspired" network motifs which may be used in addition to or in place of the network motifs extracted directly from connectomes. For example, such "biologically-inspired" network motifs can be used according to any of the techniques described herein which leverage network motifs extracted directly from connectomes. Use of the generator model in such fashion can greatly increase the amount of examples available to use when performing neural architecture searches based on network motifs, as described herein.

In yet further examples, the biological function of biological networks can be aligned with the tasks performed by the artificial neural networks. In one example, a connectome associated with neural tissue that performs visual processing can be used as the starting place for generating novel artificial network structures for artificial neural networks that are expected to perform visual processing tasks.

Artificial neural networks that have the neural network architectures identified according to the techniques described herein can be used to perform any number of different prediction tasks. As examples, the identified architectures can be used to generate models that can be used for image recognition; speech recognition; and/or any other deep learning applications.

The present disclosure address problems associated with how to generate improved neural network architectures. For example, various implementations of the present disclosure provide the ability to generate new artificial neural network architectures that provide superior performance on various real-world tasks such as speech recognition, object detection, object recognition, and/or tasks such as other speech or vision tasks. However, accuracy is not the only metric by which the new architectures may be judged or for which the new architectures provide benefits. For example, computational efficiency, robustness to adversarial examples, and/or transfer-learning capabilities are examples of other criteria for which the new architectures may advance the state-of-the-art.

In addition to improvements in the ultimate performance of neural networks, the systems and methods of the present disclosure also provide a number of other technical effects and benefits. As one example technical effect, the connectomics-derived network motifs can provide a useful and beneficial starting place (e.g., seed structure) for a neural architecture search, for example, relative to a less intelligent or complex starting place (e.g., a more basis seed structure). As such, a computing system that performs the neural architecture search may need to perform a fewer number of search rounds to reach a superior search result. That is, for search techniques that iteratively mutate or otherwise revise a structure based on feedback (e.g., evolutionary techniques and/or supervised techniques), by using the network motif as an advanced starting structure, fewer number of rounds may need to be performed overall. This reduces the amount of computing resources (e.g., processing resources, memory resources, electrical consumption, etc.) needed to complete the neural architecture search.

With reference now to the Figures, example embodiments of the present disclosure will be discussed in further detail.

Example Devices and Systems

Figure 1:
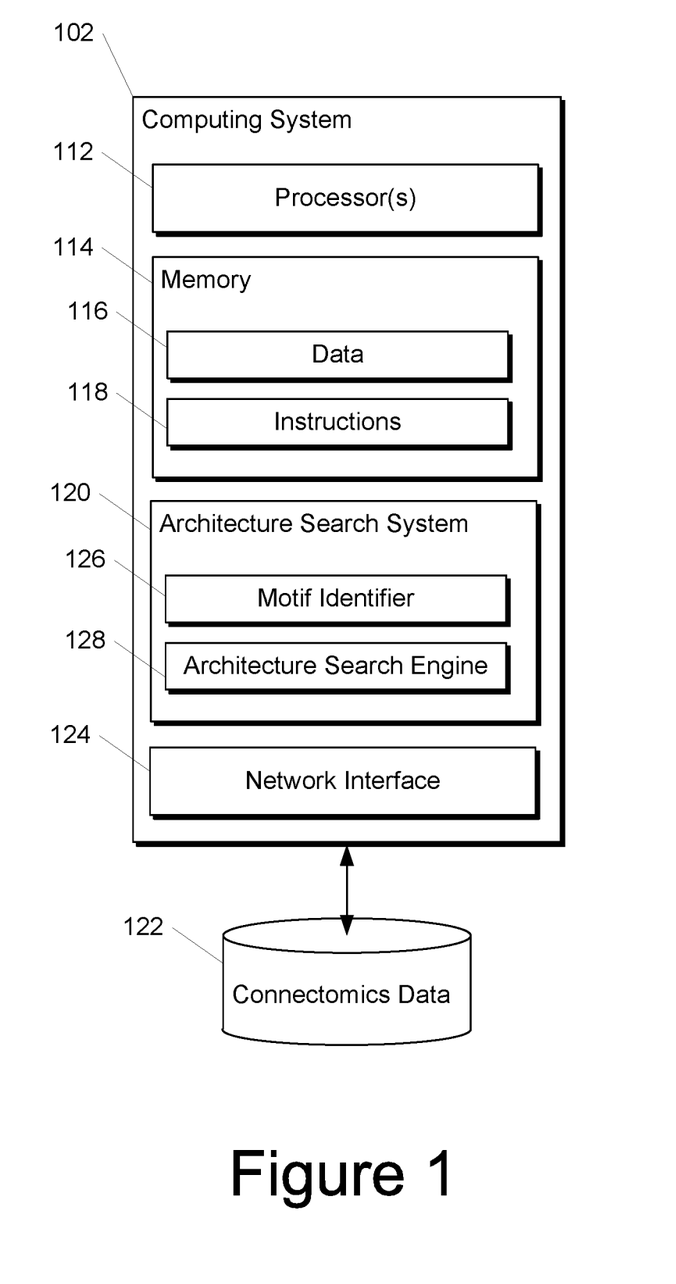
FIG. 1 depicts a block diagram of an example computing system to identify new artificial neural network architectures according to example embodiments of the present disclosure.

FIG. 1 depicts an example computing system 102 that can implement the present disclosure. The computing system 102 can include one or more physical computing devices. The one or more physical computing devices can be any type of computing device, including a server computing device, a personal computer (e.g., desktop or laptop), a mobile computing device (e.g., smartphone or tablet), an embedded computing device, or other forms of computing devices, or combinations thereof. The computing device(s) can operate sequentially or in parallel. In some implementations, the computing device(s) can implement various distributed computing techniques.

The computing system includes one or more processors 112 and a memory 114. The one or more processors 112 can be any suitable processing device (e.g., a processor core, a microprocessor, an ASIC, a FPGA, a controller, a microcontroller, tensor processing units, graphics processing units, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor(s) 112 to cause the computing system 102 to perform operations.

Figure 2:
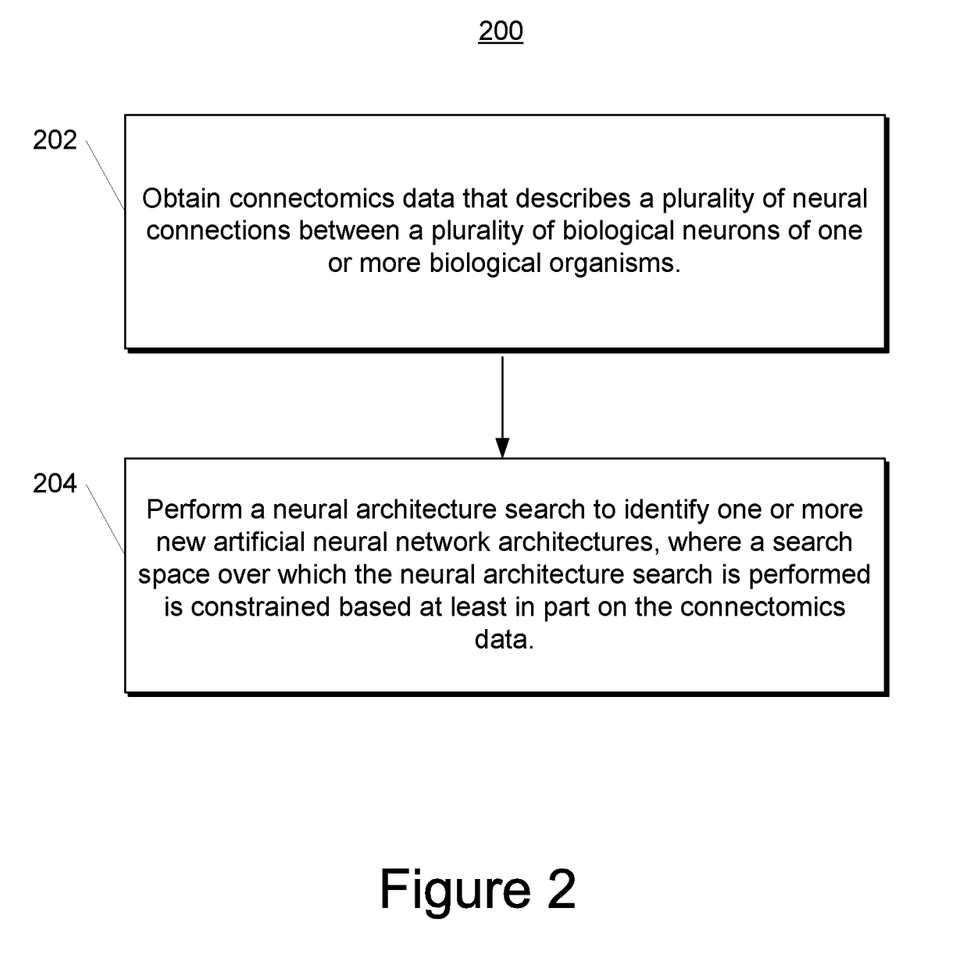
FIG. 2 depicts a flow chart diagram of an example method to identify new artificial neural network architectures according to example embodiments of the present disclosure.

The computing system 102 can further include an architecture search system 120 that is implementable to identify one or more artificial neural network architectures based on connectomics data 122. In particular, the computing system 102 can implement the architecture search system 120 to perform some or all of method 200.

The architecture search system 120 can include a motif identifier 126 and an architecture search engine 128. The motif identifier 126 can identify one or more network motifs from the connectomics data 122. For example, each network motif can include or represent a recurrent pattern within neural connections between biological neurons described by a connectome (e.g., within a directed graph provided by the connectome). As one example, the motif identifier 126 can perform various different motif search or motif finding algorithms within a directed graph provided as part of the connectomics data 122.

While motif discovery is a relatively mature area of graph algorithms, connectomes pose special considerations and new challenges. As such, the motif identifier 126 can leverage knowledge of the biophysics and geometry of the network (and the resulting effect on the computational behavior of the network) to usefully influence motif discovery.

As one example, the location of a neural connection (e.g., relative to other neural connections) impacts the function of the biological neurons connected by such neural connection. Thus, in some implementations, the motif identification process can be annotated so that the motif identifier 126 is aware of the different connection locations.

The architecture search engine 128 can perform one or more neural architecture search techniques. For example, the search techniques can be evolutionary-based approaches which evolve suggested architectures and/or reinforcement learning approaches which iteratively suggest (e.g., by a recurrent neural network-based controller) new architectures based on performance feedback. A search space over which the architecture search engine 128 can be constrained based on the connectomics data 122.

The architecture search system 120 (e.g., the motif identifier 126 and/or the architecture search engine 128) can include computer logic utilized to provide desired functionality. The architecture search system 120 (e.g., the motif identifier 126 and/or the architecture search engine 128) can be implemented in hardware, firmware, and/or software controlling a general purpose processor. For example, in some implementations, the architecture search system 120 (e.g., the motif identifier 126 and/or the architecture search engine 128) includes program files stored on a storage device, loaded into a memory and executed by one or more processors. In other implementations, the architecture search system 120 (e.g., the motif identifier 126 and/or the architecture search engine 128) includes one or more sets of computer-executable instructions that are stored in a tangible computer-readable storage medium such as RAM hard disk or optical or magnetic media.

The computing system 102 can access connectomics data 122 from one or more databases. The connectomics data 122 can include one or more connectomes, as described herein. The databases that hold the data 122 can be one database or multiple databases. Multiple databases can be co-located or can be geographically distributed.

The computing system 102 can also include a network interface 124 used to communicate with one or more systems or devices, including systems or devices that are remotely located from the computing system 102. The network interface 124 can include any number of components to provide networked communications (e.g., transceivers, antennas, controllers, cards, etc.).

Example Methods

FIG. 2 depicts a flow chart diagram of an example method to perform according to example embodiments of the present disclosure. Although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system obtains connectomics data that describes a plurality of neural connections between a plurality of biological neurons of one or more biological organisms.

In some implementations, obtaining the connectomics data at 202 can include accessing a database that stores one or more connectomes. Each of the one or more connectomes can include: connectivity data that describes the plurality of neural connections between the plurality of biological neurons; geometry data that describes a physical location of one or more of the plurality of neural connections or a shape or a location of one or more of the plurality of biological neurons; biophysics data that describes biophysical characteristics of one or more of the plurality of biological neurons; and/or activity data that describes observed activations of one or more of the plurality of biological neurons in response to one or more stimuli.

At 204, the computing system performs a neural architecture search to identify one or more new artificial neural network architectures, where a search space over which the neural architecture search is performed is constrained based at least in part on the connectomics data obtained at 202.

In some implementations, prior to performing the neural architecture search at 204, the computing system can identify one or more network motifs described by the connectomics data. Each network motif can be a recurrent pattern within the plurality of neural connections between the plurality of biological neurons. In some of such implementations, the search space over which the neural architecture search is performed at 204 can be constrained based at least in part on the one or more network motifs.

As one example, performing the neural architecture search at 204 can include using, by the one or more computing devices, at least one of the one or more network motifs as a seed structure for the neural architecture search.

As another example, performing the neural architecture search at 204 can include using, by the one or more computing devices, at least one of the one or more network motifs as a higher-level structure into which one or more lower-level structures are assembled.

In some implementations, prior to performing the neural architecture search at 204, the computing system can determine one or more statistical measures descriptive of one or more characteristics of the connectomics data or the network motifs. As examples, the statistical measures can include a ratio of inhibitory to excitatory connections; a frequency of recurrent connections; a placement of recurrent connections; a number of layers; a size of layers; a frequency of skip connections; a placement of skip connections; and/or a ratio of different neuron types. In some of such implementations, performing the neural architecture search at 204 can include one or more constraints on the neural architecture search, where the one or more constraints respectively require the one or more new artificial neural network architectures to satisfy the one or more statistical measures.

In some implementations, performing the neural architecture search at 204 can include obtaining a plurality of candidate architectures; determining a respective similarity of each candidate architecture to the one or more network motifs; and discarding one or more of the plurality of candidate architectures based on their respective similarities to the one or more network motifs.

As one example, determining the respective similarity of each candidate architecture to the one or more network motifs can include inputting each candidate architecture into a discriminator model. The discriminator model can have been trained to discriminate between authentic network motifs and inauthentic network motifs as part of a generative adversarial network. Determining the respective similarity of each candidate architecture to the one or more network motifs can include receiving a respective label for each candidate architecture as an output of the discriminator model, wherein each respective label indicates a judgment of the discriminator that the corresponding candidate architecture is authentic or inauthentic. Discarding one or more of the plurality of candidate architectures based on their respective similarities to the one or more network motifs can include discarding each candidate architecture that received a label indicating a judgment of the discriminator that the corresponding candidate architecture is inauthentic.

In some implementations, prior to performing the neural architecture search at 204, the computing system can use a generator model to generate a plurality of synthetic motifs. The generator model can have been trained as part of a generative adversarial network trained using the one or more network motifs as training data. In some of such implementations, performing the neural architecture search at 204 can include performing the neural architecture search, where the search space over which the neural architecture search is performed is constrained based at least in part on a combination of the one or more network motifs with the plurality of synthetic motifs.

In some implementations, the method 200 can further include modifying one or more parameters of at least one of the new artificial neural network architectures based at least in part on the connectomics data.

As one example, in some implementations, the connectomics data can include biophysics data that describes biophysical characteristics of one or more of the plurality of biological neurons and the method 200 can further include selecting, based on the biophysics data, a respective activation function for one or more artificial neurons that respectively correspond to the one or more of the plurality of biological neurons.

As another example, in some implementations, the connectomics data can include biophysics data that describes a respective synaptic release probability of one or more of the plurality of neural connections and the method 200 can further include selecting, for each of one or more edges between artificial neurons, a respective edge weight based on the respective synaptic release probability associated with a corresponding one of the plurality of neural connections.

As yet another example, in some implementations, the connectomics data can include activity data that describes observed activations of a first biological neuron of the plurality of biological neurons in response to one or more stimuli. In some of such implementations, the method 200 can further include modifying one or more parameters of a first artificial neuron included in the new artificial neural network architecture that corresponds to the first biological neuron such that test activations of the first artificial neuron to the one or more stimuli approximate the observed activations of the first biological neuron in response to the one or more stimuli.

Example Neural Architecture Search System

Figure 3:
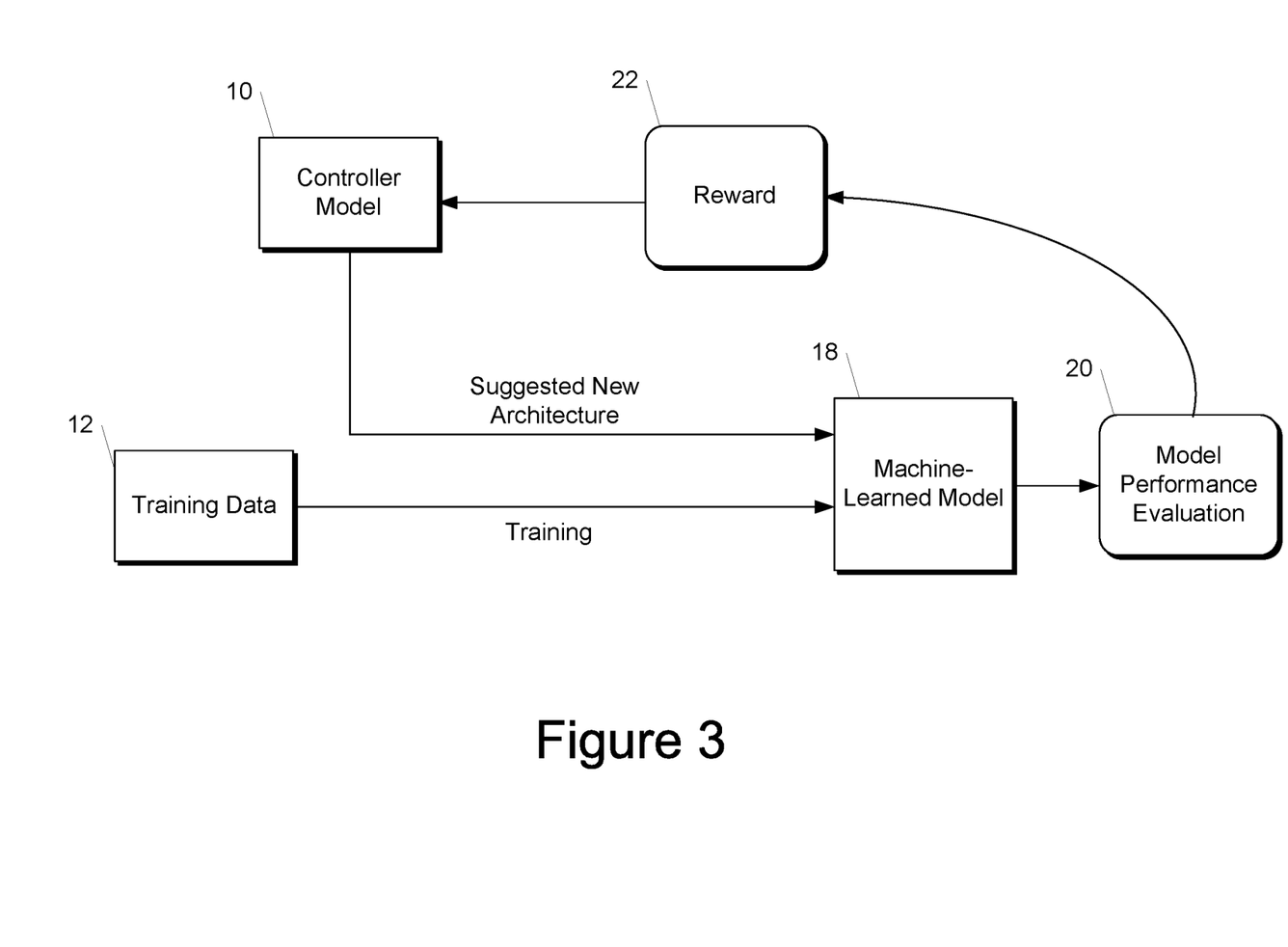
FIG. 3 depicts a block diagram of data flow in an example reinforcement learning approach according to example embodiments of the present disclosure.

FIG. 3 depicts a block diagram of data flow in an example reinforcement learning approach according to example embodiments of the present disclosure. In particular, the illustrated approach can be applied in an iterative fashion. The illustrated approach includes a controller model 10 which can operate to select or otherwise generate, at each iteration, a suggested new architecture for a machine-learned model 18. In particular, in some implementations, the controller model 10 can select the suggested new architecture from a search space that has been constrained based on connectomics data, as described elsewhere herein.

At each iteration, the new architecture for the machine-learned model 18 can be trained on a set of training data 12. The training data 12 can be any type of training data including image data, audio data, text data, sensor data, and/or other forms of data. The training data 12 can be supervised training data. As examples, the training data 12 can be images that have been annotated to make them useful for an object detection task or any other computer vision task. Alternatively, the machine-learned can be structured for and/or evaluated in an unsupervised learning context.

At each iteration, a performance metric 20 (e.g., average precision, accuracy, latency, model data size, and/or various other measures of model performance) can be evaluated for the trained model 18.

According to the reinforcement learning architecture, at each iteration, the controller model 10 can be provided with a reward 22 that is a function of the performance 20 of the model 18. The parameters of the controller model 10 can be updated based on the reward. For example, the controller model 10 can be a recurrent neural network and the reward function can be backpropagated through the recurrent neural network to train the network. In such fashion, the controller model 10 can learn over time to generate suggested new model architectures which cause the machine-learned model 18 to perform at an increased performance level.

Although aspects of the present disclosure focus on a reinforcement learning approach, other example embodiments may operate according to an evolutionary scheme. For example, in the evolutionary scheme, the controller model 10 can be configured to generate a suggested new architecture through an evolutionary mutation. The performance 20 of the model 18 obtained via the most recently proposed architecture can be compared to a best previously observed performance to determine, for example, whether to retain the most recently proposed architecture or to discard the most recently proposed architecture and instead return to a best previously observed architecture. Thereafter, to generate the next iterative suggested new architecture, the controller model can perform evolutionary mutations on the architecture selected based on the comparison described above.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments.

Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

One example aspect of the present disclosure is directed to a computer-implemented method of automatically generating neural network architectures. The method comprises: receiving data representing connections between a plurality of neurons of a biological organism; and processing the received data to generate the one or more new neural network architectures that are based on the data representing connections but that are different than the connections between the plurality of neurons.

In some implementations, processing the received data comprises: performing a neural architecture search using the received data.

In some implementations, processing the received data to generate the one or more neural network architectures comprises: identifying one or more network motifs described by the received data, each of the one or more network motifs comprising a recurrent pattern within the received data; and generating the one or more neural network architectures based upon the identified one or more network motifs.

In some implementations, generating the one or more neural network architectures based upon the identified one or more network motifs comprises using at least one of the one or more network motifs as a seed structure for the one or more neural network architectures.

In some implementations, generating the one or more neural network architectures based upon the identified one or more network motifs comprises using at least one of the one or more network motifs as a higher-level structure into which one or more lower-level structures are assembled.

In some implementations, processing the received data to generate the one or more neural network architectures further comprises: determining one or more characteristics of the received data or the network motifs; and generating the one or more neural network architectures based on the one or more characteristics.

In some implementations, the one or more characteristics describe one or more of: a ratio of inhibitory to excitatory connections; a frequency of recurrent connections; a placement of recurrent connections; a number of layers; a size of layers; a frequency of skip connections; a placement of skip connections; or a ratio of different neuron types.

In some implementations, processing the received data to generate the one or more neural network architectures comprises: obtaining a plurality of candidate architectures; determining a respective similarity of each candidate architecture to the one or more network motifs; and discarding one or more of the plurality of candidate architectures based on their respective similarities to the one or more network motifs.

In some implementations, determining the respective similarity of each candidate architecture to the one or more network motifs comprises: inputting each candidate architecture into a discriminator model, the discriminator model trained to discriminate between authentic network motifs and inauthentic network motifs as part of a generative adversarial network; and receiving a respective label for each candidate architecture as an output of the discriminator model, wherein each respective label indicates a judgment of the discriminator model that the corresponding candidate architecture is authentic or inauthentic; and discarding one or more of the plurality of candidate architectures based on their respective similarities to the one or more network motifs comprises discarding each candidate architecture that received a label indicating a judgment of the discriminator that the corresponding candidate architecture is inauthentic.

In some implementations, the method further comprises generating a plurality of synthetic motifs using a generator model, the generator model trained as part of a generative adversarial network trained using the one or more network motifs as training data; and using the one or more of the synthetic motifs to generate the one or more neural network architectures.

In some implementations, the received data comprises: connectivity data that describes the plurality of neural connections between the plurality of biological neurons; geometry data that describes a physical location of one or more of the plurality of neural connections or a shape or a location of one or more of the plurality of biological neurons; biophysics data that describes biophysical characteristics of one or more of the plurality of biological neurons; or activity data that describes observed activations of one or more of the plurality of biological neurons in response to one or more stimuli.

In some implementations, the received data comprises biophysics data that describes biophysical characteristics of one or more of the plurality of biological neurons; and the method further comprises selecting, based on the biophysics data, a respective activation function for one or more artificial neurons that respectively correspond to the one or more of the plurality of biological neurons.

In some implementations, the received data comprises biophysics data that describes a respective synaptic release probability of one or more of the plurality of neural connections; and the method further comprises selecting, for each of one or more edges between artificial neurons, a respective edge weight based on the respective synaptic release probability associated with a corresponding one of the plurality of neural connections.

In some implementations, the received data comprises activity data that describes observed activations of a first biological neuron of the plurality of biological neurons in response to one or more stimuli; and the method further comprises modifying one or more parameters of a first artificial neuron included in the one or more new artificial neural network architectures that corresponds to the first biological neuron such that test activations of the first artificial neuron to the one or more stimuli approximate the observed activations of the first biological neuron in response to the one or more stimuli.

In some implementations, modifying the one or more parameters of the first artificial neuron comprises performing supervised learning on the first artificial neuron using the activity data as training data.

In some implementations, the plurality of biological neurons are contained within brain tissue of the one or more biological organisms.

What is claimed is:

1. A computer-implemented method, the method comprising:
    obtaining, by one or more computing devices, connectomics data that describes a plurality of neural connections between a plurality of biological neurons of one or more biological organisms;
    identifying, by the one or more computing devices, one or more network motifs described by the connectomics data, each network motif comprising a recurrent pattern within the plurality of neural connections between the plurality of biological neurons; and
    performing, by the one or more computing devices, a neural architecture search to identify one or more new artificial neural network architectures;
    wherein performing, by the one or more computing devices, the neural architecture search to identify the one or more new artificial neural network architectures comprises using, by the one or more computing devices, at least one of the one or more network motifs as a seed structure for the neural architecture search, the seed structure providing an initial state for the neural architecture search.

2. The computer-implemented method of claim 1, wherein performing, by the one or more computing devices, the neural architecture search to identify the one or more new artificial neural network architectures comprises using, by the one or more computing devices, at least one of the one or more network motifs as a higher-level structure into which one or more lower-level structures are assembled.

3. The computer-implemented method of claim 1, further comprising:
    determining, by the one or more computing devices, one or more statistical measures descriptive of one or more characteristics of the connectomics data or the network motifs;
    wherein performing, by the one or more computing devices, the neural architecture search to identify the one or more new artificial neural network architectures comprises imposing, by the one or more computing devices, one or more constraints on the neural architecture search, wherein the one or more constraints respectively require the one or more new artificial neural network architectures to satisfy the one or more statistical measures.

4. The computer-implemented method of claim 3, wherein the one or more statistical measures describe one or more of:
    a ratio of inhibitory to excitatory connections;
    a frequency of recurrent connections;
    a placement of recurrent connections;
    a number of layers;
    a size of layers;
    a frequency of skip connections;
    a placement of skip connections; or
    a ratio of different neuron types.

5. The computer-implemented method of claim 1, wherein performing, by the one or more computing devices, the neural architecture search to identify the one or more new artificial neural network architectures comprises:
    obtaining, by the one or more computing devices, a plurality of candidate architectures;
    determining, by the one or more computing devices, a respective similarity of each candidate architecture to the one or more network motifs; and
    discarding, by the one or more computing devices, one or more of the plurality of candidate architectures based on their respective similarities to the one or more network motifs.

6. The computer-implemented method of claim 5, wherein:
    determining, by the one or more computing devices, the respective similarity of each candidate architecture to the one or more network motifs comprises:
    inputting, by the one or more computing devices, each candidate architecture into a discriminator model, the discriminator model trained to discriminate between authentic network motifs and inauthentic network motifs as part of a generative adversarial network; and
    receiving, by the one or more computing devices, a respective label for each candidate architecture as an output of the discriminator model, wherein each respective label indicates a judgment of the discriminator model that the corresponding candidate architecture is authentic or inauthentic; and
    discarding, by the one or more computing devices, one or more of the plurality of candidate architectures based on their respective similarities to the one or more network motifs comprises discarding, by the one or more computing devices, each candidate architecture that received a label indicating a judgment of the discriminator that the corresponding candidate architecture is inauthentic.

7. The computer-implemented method of claim 1, further comprising:
    prior to performing the neural architecture search, using, by the one or more computing devices, a generator model to generate a plurality of synthetic motifs, the generator model trained as part of a generative adversarial network trained using the one or more network motifs as training data;
    wherein a search space over which the neural architecture search is performed is constrained based at least in part on a combination of the one or more network motifs with the plurality of synthetic motifs.

8. The computer-implemented method of claim 1, wherein obtaining,
by the one or more computing devices, connectomics data that describes the plurality of neural connections between the plurality of biological neurons of the one or more biological organisms comprises accessing, by the one or more computing devices, a database that stores one or more connectomes, each of the one or more connectomes comprising one or more of:
connectivity data that describes the plurality of neural connections between the plurality of biological neurons;
geometry data that describes a physical location of one or more of the plurality of neural connections or a shape or a location of one or more of the plurality of biological neurons;
biophysics data that describes biophysical characteristics of one or more of the plurality of biological neurons; or
activity data that describes observed activations of one or more of the plurality of biological neurons in response to one or more stimuli.

9. The computer-implemented method of claim 1, wherein:
the connectomics data comprises biophysics data that describes biophysical characteristics of one or more of the plurality of biological neurons; and
the method further comprises selecting, by the one or more computing devices based on the biophysics data, a respective activation function for one or more artificial neurons that respectively correspond to the one or more of the plurality of biological neurons.

10. The computer-implemented method of claim 1, wherein:
the connectomics data comprises biophysics data that describes a respective synaptic release probability of one or more of the plurality of neural connections; and
the method further comprises selecting, by the one or more computing devices, for each of one or more edges between artificial neurons, a respective edge weight based on the respective synaptic release probability associated with a corresponding one of the plurality of neural connections.

11. The computer-implemented method of claim 1, wherein:
the connectomics data comprises activity data that describes observed activations of a first biological neuron of the plurality of biological neurons in response to one or more stimuli; and
the method further comprises modifying, by the one or more computing devices, one or more parameters of a first artificial neuron included in the one or more new artificial neural network architectures that corresponds to the first biological neuron such that test activations of the first artificial neuron to the one or more stimuli approximate the observed activations of the first biological neuron in response to the one or more stimuli.

12. The computer-implemented method of claim 11, wherein modifying, by the one or more computing devices, the one or more parameters of the first artificial neuron comprises performing, by the one or more computing devices, supervised learning on the first artificial neuron using the activity data as training data.

13. The computer-implemented method of claim 1, wherein the plurality of biological neurons are contained within brain tissue of the one or more biological organisms.

14. A computing system comprising:
one or more processors; and
one or more non-transitory computer-readable media that store instructions that, when executed by the one or more processors, cause the computing system to perform operations, the operations comprising:
obtaining connectomics data that describes a plurality of neural connections between a plurality of biological neurons of one or more biological organisms;
identifying one or more network motifs described by the connectomics data, each network motif comprising a recurrent pattern within the plurality of neural connections between the plurality of biological neurons; and
performing a neural architecture search to identify one or more new artificial neural network architectures;
wherein performing the neural architecture search to identify the one or more new artificial neural network architectures comprises using at least one of the one or more network motifs as a seed structure for the neural architecture search, the seed structure providing an initial state for the neural architecture search.

15. The computing system of claim 14, wherein performing the neural architecture search to identify the one or more new artificial neural network architectures comprises using at least one of the one or more network motifs as a higher-level structure into which one or more lower-level structures are assembled.

16. The computing system of claim 14, further comprising:
determining one or more statistical measures descriptive of one or more characteristics of the connectomics data or the network motifs;
wherein performing the neural architecture search to identify the one or more new artificial neural network architectures comprises imposing one or more constraints on the neural architecture search, wherein the one or more constraints respectively require the one or more new artificial neural network architectures to satisfy the one or more statistical measures.

17. The computing system of claim 16, wherein the one or more statistical measures describe one or more of:
a ratio of inhibitory to excitatory connections;
a frequency of recurrent connections;
a placement of recurrent connections;
a number of layers;
a size of layers;
a frequency of skip connections;
a placement of skip connections; or
a ratio of different neuron types.

18. The computing system of claim 14, wherein performing the neural architecture search to identify the one or more new artificial neural network architectures comprises:
obtaining a plurality of candidate architectures;
determining a respective similarity of each candidate architecture to the one or more network motifs; and
discarding one or more of the plurality of candidate architectures based on their respective similarities to the one or more network motifs.

19. The computing system of claim 18, wherein:
determining the respective similarity of each candidate architecture to the one or more network motifs comprises:
inputting each candidate architecture into a discriminator model, the discriminator model trained to discriminate between authentic network motifs and inauthentic network motifs as part of a generative adversarial network; and receiving a respective label for each candidate architecture as an output of the discriminator model, wherein each respective label indicates a judgment of the discriminator model that the corresponding candidate architecture is authentic or inauthentic; and discarding one or more of the plurality of candidate architectures based on their respective similarities to the one or more network motifs comprises discarding each candidate architecture that received a label indicating a judgment of the discriminator that the corresponding candidate architecture is inauthentic.

20. One or more non-transitory computer-readable media that collectively store instructions that, when executed by one or more computing devices, cause the one or more computing devices to perform operations, the operations comprising:

obtaining connectomics data that describes a plurality of neural connections between a plurality of biological neurons of one or more biological organisms;

identifying one or more network motifs described by the connectomics data, each network motif comprising a recurrent pattern within the plurality of neural connections between the plurality of biological neurons; and     performing a neural architecture search to identify one or more new artificial neural network architectures;

wherein performing the neural architecture search to identify the one or more new artificial neural network architectures comprises using at least one of the one or more network motifs as a seed structure for the neural architecture search, the seed structure providing an initial state for the neural architecture search.

* * * * *